(12) United States Patent
Starzmann et al.

(10) Patent No.: US 7,828,039 B2
(45) Date of Patent: Nov. 9, 2010

(54) GUIDELESS WINDOW SHADE WITH IMPROVED SLIDERS

(75) Inventors: Michael Starzmann, Baltmannsweiler (DE); Dieter Gassenheimer, Weinstadt (DE); Herbert Walter, Ebersbach (DE); Klaus Güsewell, Salach (DE)

(73) Assignee: BOS GmbH & Co. KG, Ostfildern (DE)

( * ) Notice: Subject to any disclaimer, the term of this patent is extended or adjusted under 35 U.S.C. 154(b) by 268 days.

(21) Appl. No.: 11/067,032

(22) Filed: Feb. 25, 2005

(65) Prior Publication Data

US 2005/0194109 A1 Sep. 8, 2005

(30) Foreign Application Priority Data

Feb. 27, 2004 (DE) .................. 10 2004 009 482

(51) Int. Cl.
*B60J 3/00* (2006.01)

(52) U.S. Cl. .................. 160/370.22; 296/97.7; 296/97.8

(58) Field of Classification Search ............ 160/370.22, 160/265, 310, 23.1, 121.1, 133, 238, 331, 160/22, 72–75, 78; 296/97.7, 97.8, 143; 16/110.1, 442; 428/28; 40/515; 384/13

See application file for complete search history.

(56) References Cited

U.S. PATENT DOCUMENTS

| | | | | | |
|---|---|---|---|---|---|
| 1,459,180 | A | * | 6/1923 | Hein ...................... | 296/97.8 |
| 1,831,128 | A | * | 11/1931 | McKenny et al. .......... | 160/331 |
| 2,678,183 | A | * | 5/1954 | Bell ...................... | 248/278.1 |
| 4,836,263 | A | | 6/1989 | Ament | |
| 6,089,305 | A | * | 7/2000 | Gruben et al. ............. | 160/271 |
| 6,131,987 | A | * | 10/2000 | Rossiter .................. | 296/97.8 |
| 6,135,192 | A | * | 10/2000 | Suzuki et al. ............. | 160/370.22 |
| 6,176,617 | B1 | * | 1/2001 | Kamimura et al. ........... | 384/13 |
| 6,186,587 | B1 | * | 2/2001 | Entenmann ............... | 296/214 |
| 6,290,394 | B1 | * | 9/2001 | Obara et al. .............. | 384/13 |
| 6,349,986 | B1 | * | 2/2002 | Seel et al. ............... | 296/37.16 |
| 6,427,751 | B1 | * | 8/2002 | Schlecht et al. ........... | 160/370.22 |
| 6,557,616 | B2 | * | 5/2003 | Schlect .................. | 160/370.22 |
| 6,695,381 | B2 | * | 2/2004 | Schlecht et al. ............ | 296/97.4 |
| 6,834,705 | B2 | * | 12/2004 | Seel ..................... | 160/370.22 |
| 6,840,562 | B2 | * | 1/2005 | Schlecht et al. ............ | 296/97.9 |
| 6,968,887 | B2 | * | 11/2005 | Hansen et al. ............. | 160/370.22 |
| 7,059,651 | B2 | * | 6/2006 | Bohm et al. .............. | 296/97.11 |
| 2002/0033244 | A1 | * | 3/2002 | Schlecht et al. ........... | 160/370.22 |
| 2002/0033544 | A1 | * | 3/2002 | Jager .................... | 261/122.1 |

FOREIGN PATENT DOCUMENTS

DE 7013134 U 9/1970

(Continued)

*Primary Examiner*—Katherine W Mitchell
*Assistant Examiner*—Candace L Bradford
(74) *Attorney, Agent, or Firm*—Leydig, Voit & Mayer, Ltd.

(57) ABSTRACT

A window shade arrangement has holding levers in order to draw the window shade material from the wind-up roller shaft and to hold it in a drawn out or extended position. The holding levers include hinged sliding elements that slide in associated guide grooves in the pull-out element or bar. To ensure stop-free, smooth operation, these sliding elements can be provided with a lubricant reservoir, can have a dumbbell shape, can have a cylindrical shape or some combination thereof.

41 Claims, 5 Drawing Sheets

FOREIGN PATENT DOCUMENTS

| | | |
|---|---|---|
| DE | 3612165 A1 | 10/1987 |
| DE | 3743086 A1 | 6/1989 |
| DE | 29913753 U1 | 1/2000 |
| DE | 19835257 A1 | 2/2000 |
| EP | 0240747 A2 | 10/1987 |
| EP | 0953464 A1 | 11/1999 |
| EP | 1233229 A2 | 8/2002 |
| EP | 1426548 A2 | 6/2004 |
| JP | 59190512 A | 10/1984 |
| JP | 02101963 A | 4/1990 |
| JP | 4058620 U | 5/1992 |
| JP | 05-286362 | 2/1993 |
| JP | 07091444 A | 4/1995 |
| JP | 02-021049 | 2/1996 |
| JP | 09-207565 | 8/1997 |
| JP | 10-196252 | 7/1998 |
| JP | 2000503952 T | 4/2000 |
| JP | 2001-208056 | 8/2001 |
| JP | 2001-239829 | 9/2001 |
| WO | WO 97/27129 | 7/1997 |

\* cited by examiner

GUIDELESS WINDOW SHADE WITH IMPROVED SLIDERS

FIELD OF THE INVENTION

The invention pertains to window shades for windows of motor vehicles, more particularly to a window shade for the rear window of a motor vehicle.

BACKGROUND OF THE INVENTION

A guideless rear window shade for motor vehicles is described in DE 36 12 165 A1. The disclosed window shade has a rotatable supported wind-up roller shaft to which one edge of a trapezoidal shade material is attached. The other edge of the shade material that is remote from the wind-up roller shaft is connected to a pull rod or a pull-out element. This pull-out element sits on the free end of two holding levers that are supported so that they can rotate next to the wind-up roller shaft on hinge axes. The hinge axes are aligned perpendicular to the axis of the wind-up roller shaft.

Two drive devices are used to hold and retract the window shade. One drive device comprises a spring-driven motor, which is housed in the wind-up roller shaft. The wind-up roller shaft is biased in the winding direction to take up the window shade material. The other activation and drive device is a geared motor, which carries a crank disk on its output shaft. The crank disk is connected via coupling rods to the holding levers. In the retracting position, the holding levers lie parallel to the wind-up roller shaft and are moved by setting the geared motor into a position in which the holding levers stand essentially perpendicular to the wind-up roller shaft. In this way, the free ends of the holding levers slide through grooves that run along the pull-out element. The end of the holding lever undergoes a combination movement, namely a linear movement parallel to the longitudinal extent of the pull-out element and also a tilting or pivoting movement. To enable this degree of freedom, a sliding body is between the pull-out profile and the end of the holding lever, which is connected via a hinge to the holding lever. The head of the sliding body runs through the groove in the pull-out element. The groove in the pull-out element is undercut in the sense that the groove is assembled from a groove chamber and a groove slot. The width of the groove slot is smaller than the width of the groove chamber.

Because the spring-driven motor is constantly biased, the window shade material is again retracted and the window shade material exerts a tilting moment on the pull-out element, in particular a tilting moment relative to an axis that is parallel to the pull-out element and thus parallel to the wind-up roller shaft. In commercially available window shades, to transfer this tilting moment to the holding lever, the head of the sliding body has a shape similar to a T nut, while the groove chamber has a rectangular cross sectional profile.

It has been shown that after long use, the movement of the sliding body in the guide groove is not entirely smooth, but is characterized by fits and starts while being pulled out and retracted. Such movement is generally undesirable.

BRIEF SUMMARY OF THE INVENTION

In view of the foregoing, an object of the invention is to provide a window shade with holding levers in which the sliding bodies travel in the guide groove without fits and starts even after long periods of operation.

With the new window shade of the present invention, the window shade material is brought into an extended position with the aid of two holding levers, or is moved in a controlled manner into the retracted position from the extended position. The holding levers assume the carrying of the window shade material at least in the intermediate region as the holding levers are resistant to kinking and bending at least in the direction perpendicular to the plane defined by the held window shade material.

Because the path traveled by the window shade material when it is being pulled out is usually greater than half the length of the wind-up roller shaft, for each holding lever a separate guide groove is provided as the free ends of the holding levers cross once sometime during the course of the pivoting motion. For shorter window shades, a single groove in which both holding levers run would suffice. However, such an arrangement assumes that the ends of the holding lever are still spaced a certain distance from each other also in the retracted state and do not cross each other.

So that the connection between the holding lever and the pull-out element is maintained with certainty, the guide grooves in the pull-out element are undercut grooves. The open width of the groove chamber is greater than the groove slot, so that a sliding body guided in the groove cannot come out of the chamber through the slot. The cross sectional shape of the groove chamber is adapted to the cross sectional shape of a head of the sliding body. The sliding body itself is connected to the holding lever via a hinge.

According to one embodiment of the invention, the return freedom during the sliding motion is achieved by providing the sliding body with a lubricant reservoir, by means of which the sliding surface between the sliding body and the wall of the guide groove is constantly lubricated such that the coefficient of friction is kept low.

According to another embodiment, the head of the sliding body is shaped somewhat cylindrically, so that contact points that have a small spacing from each other and could lead to greater friction when the pull-out element tilts about the longitudinal axis are prevented.

According to a third embodiment, to guarantee the return freedom for a long period of time, the head of the sliding body is tapered in a middle region. Overall, the head of the sliding body has the shape of a dumbbell. The cross-section can be round or profiled. The dumbbell shape also has the advantage of being able to be used in guide grooves that have a curved course if such a course is required by the course of the pull-out element, which is adapted up to a certain degree to the course of the rear window.

These different embodiments for achieving jerk-free running of the sliding body through the associated guide groove can also be combined arbitrarily with each other. However, according to the particulars of each application, one of the three embodiments should be sufficient.

Preferably, the pull-out element contains two guide grooves, with one guide groove being assigned to each holding lever. In this way, the holding levers can pass each other and drawing lengths are achieved, which are greater than half the length of the wind-up roller shaft.

The biased window shade material generates a tilting moment of the pull-out profile about its longitudinal axis. To introduce this tilting moment into the holding lever, the groove chamber can have a cross section that deviates from a circular shape.

Alternatively, a continuous shoulder is provided on which the sliding element can be supported, next to the groove slot and thus outside the guide groove. In such a case, the points receiving the tilting moment are spatially far removed from each other, which reduces the forces when the tilting moment is introduced. Therefore, the overall space is somewhat larger.

One skilled in the art will understand which arrangement can be used for a particular situation.

The bearing of the tilting moment in the groove chamber is aided when the sliding element is provided with a lubricant reservoir. In this way, the coefficient of friction is reduced and jerk free, smooth travel can be achieved, although the contact points receiving the tilting moment in the longitudinal and transverse direction lie spatially packed close to each other.

Another lubricant reservoir can be contained in the groove chamber itself by providing grooves filled with lubricant that run in the longitudinal direction of the groove chamber.

In the simplest case, the sliding element can be assembled from a head and a bracket, with the cross section of the head being adapted to the cross section of the corresponding groove chamber. For the use of a cylindrical groove chamber, the head can have a corresponding circular cross section and can thus be set essentially free from force relative to the longitudinal axis of the guide groove so as to prevent blockage.

The bracket extending from the head can be used simultaneously as a hinge bracket, with which the sliding element is hinged to the associated holding lever.

The lubricant reservoir on the sliding element can be formed in one case by the tapering that the head a dumbbell shape or alternatively by lubricant grooves, which are formed in the head and do not extend parallel to the direction of motion of the sliding element. Through the tilted arrangement of the grooves, the lubricant can wet the entire wall of the groove chamber.

The use of the grooves is not limited to sliding elements having a head with a circular cross section. The grooves can also be used for sliding elements having a head with a profiled cross section, e.g., a rectangular or square cross section. Likewise, the dumbbell shape is not limited to sliding elements with rotationally symmetric heads. The advantages of the dumbbell shape can also be realized in sliding elements whose heads are rectangular or square.

The volume of the lubricant reservoir becomes larger if the sliding element contains a continuous chamber in the longitudinal direction in the region of the head. This chamber connects to the outer surface of the head via at least one bore hole.

By studying the described embodiment, it becomes clear that a series of modifications is possible, which remain as choices for a person skilled in the art and which are affected by the other initial technical conditions.

DETAILED DESCRIPTION OF THE INVENTION

Figure 1:
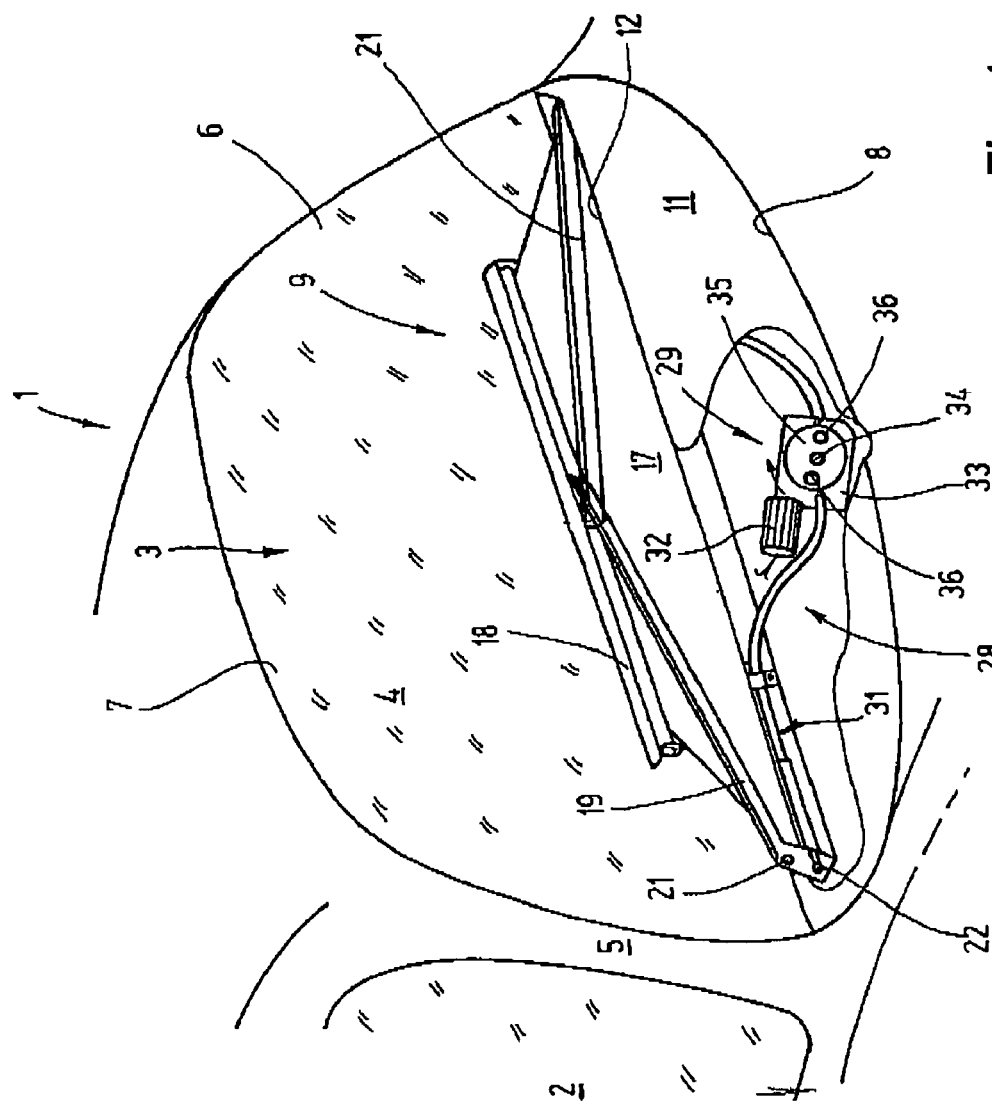
FIG. 1 is a schematic perspective view of an exemplary rear window of a motor vehicle having a window shade according to the invention with a partially cutaway rear window deck.

FIG. 1 illustrates very schematically the rear part of a motor vehicle 1. In FIG. 1, a left rear side window 2 as well as a rear window 3 having the typically curved window pane 4 can be seen. The window pane 4 is located between two side C columns 5 and 6 and is bordered at the top by a rear edge 7 of the roof and at the bottom by an edge 8. A window shade 9 is provided in front of the inside of the window pane 4, which is shown in a partially drawn out position. In the interior of the vehicle, a rear window deck 11 is arranged in front of the rear window 3 (shown partially cutaway in FIG. 1). The rear window deck 11 contains a run out slot 12 extending over nearly the entire width of the rear window deck 11. The rear window deck 11 fills the region between the rear seat of the vehicle and the rear window 3.

Figure 2:
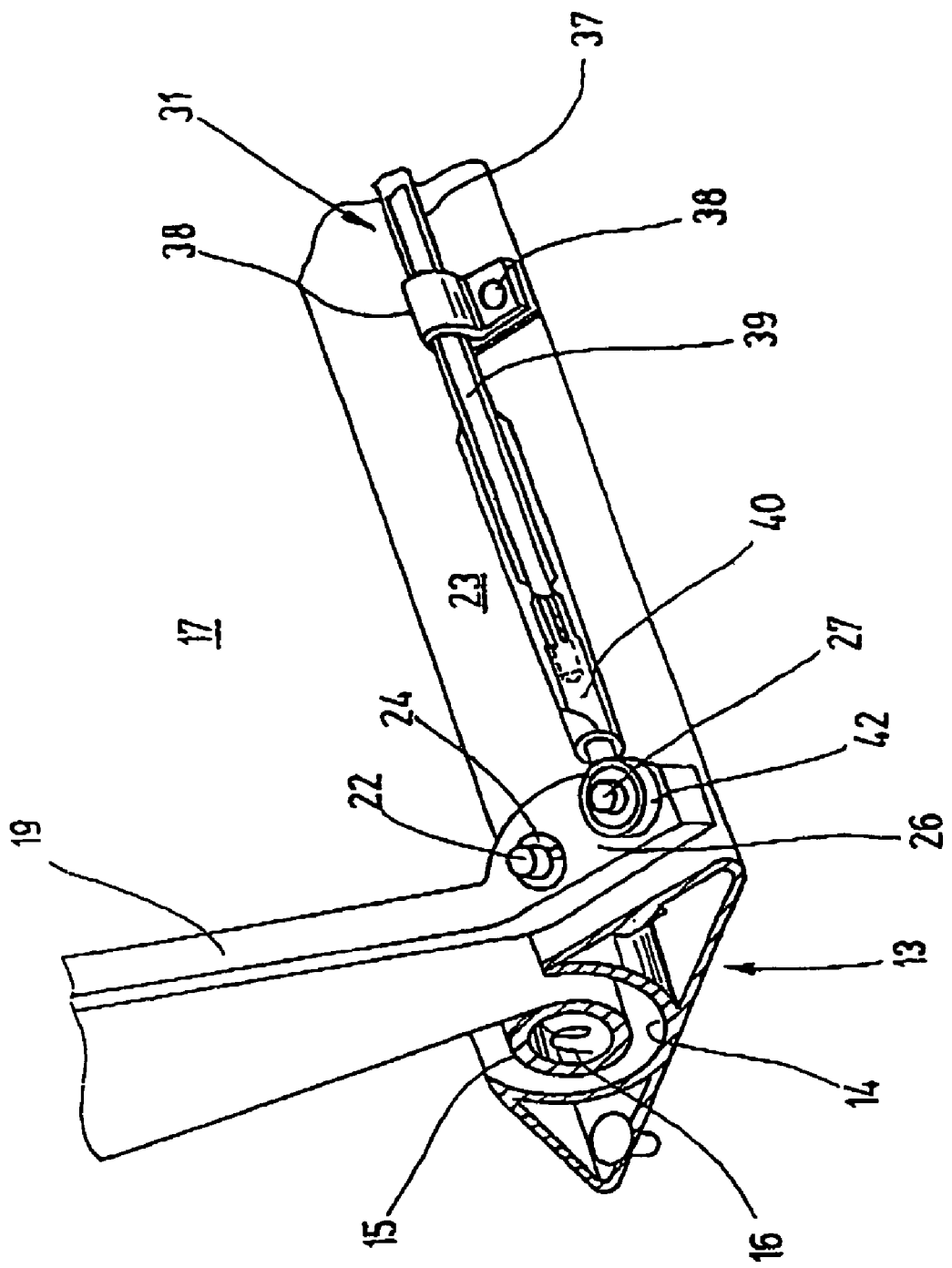
FIG. 2 is a cutaway, perspective view of one end of the housing of the window shade of FIG. 1 showing the support and the drive of one holding lever.

As shown in FIG. 2, the window shade 9 includes a housing 13 that is fixed under the rear window deck 11. The housing 13 is in the shape of an extruded profile with an approximately triangular cross section. A cylindrical groove 14 is provided in the housing 13 which extends over the entire width of the window shade 9. The groove 14 is open towards the top. A wind-up roller shaft 15 is rotatably supported in the groove 14. The wind-up roller shaft 15 is supported, in this case, by pegs that are fixed in end pieces of the housing 13.

In the illustrated embodiment, the wind-up roller shaft 15 is biased in one rotational direction by a shortened, winding spring 16, which is anchored on one end to the adjacent housing end piece and on the other end in the wind-up roller shaft 15. The spring 16, which is helical, operates as a spring-driven motor. The window shade material 17, which is cut approximately trapezoidal, has one edge fixed to the wind-up roller shaft 15. The edge of the window shade material 17 remote from the wind-up roller shaft 15 and which extends parallel to the shaft is connected to a pull-out element or bar 18, which also reinforces the associated edge of the window shade 17. As shown in FIGS. 1 and 2, the window shade material 17 leads upwards from the cylindrical groove 14 and through the run out slot 12.

To hold the window shade material 17, two activation elements are provided in the form of holding levers 19 and 21. Each of the two levers 19 and 21 is supported so that it can rotate by means of an associated pivoting peg or bearing 22 at each end of the housing 13. This is shown in the broken region of FIG. 1 and the left end of the window shade 9 shown in FIG. 2. The pivoting peg 22 is fixed to a flat housing surface 23 pointing rearward relative to the motor vehicle. In the installed state, the housing surface 23 extends parallel to a plane defined by the rear window 4. In this way, the two levers 19 and 21 pivot in said plane (particularly, in opposite directions) since each lever is supported by its respective pivoting peg on a respective end of the housing 13. For rotational support, the peg 22 projects through a corresponding bore hole in the lever 19 or 21, which is secured axially on the peg 22 with the aid of a claw spring 24 axially. The end of each of the levers 19 and 21 remote from the respective pivoting peg 22 is slidably connected to the pull-out element or bar 18.

For pivoting the levers 19 and 21, each lever 19 and 21 (as shown in the drawings with respect to lever 19) is provided with a lever extension 26, which extends in the radial direction from the activation element 19 over the pivoting peg 22. The lever extension 26 carries a crank pin 27, which is axially parallel to the peg 22. So that the two pivot levers 19 and 21 can be pivoted during retraction and extension or pulling out of the window shade material 17, a drive device 28 is provided that includes a geared motor 29, as well as two flexible coupling elements 31. The geared motor 29 includes a permanently excited DC motor 32 and a reduction gear 33. The output shaft 34 of the reduction gear carries a disk 35 locked in rotation with the output shaft and which carries two crank pins 36 axially parallel to the output shaft 34.

Figure 3:
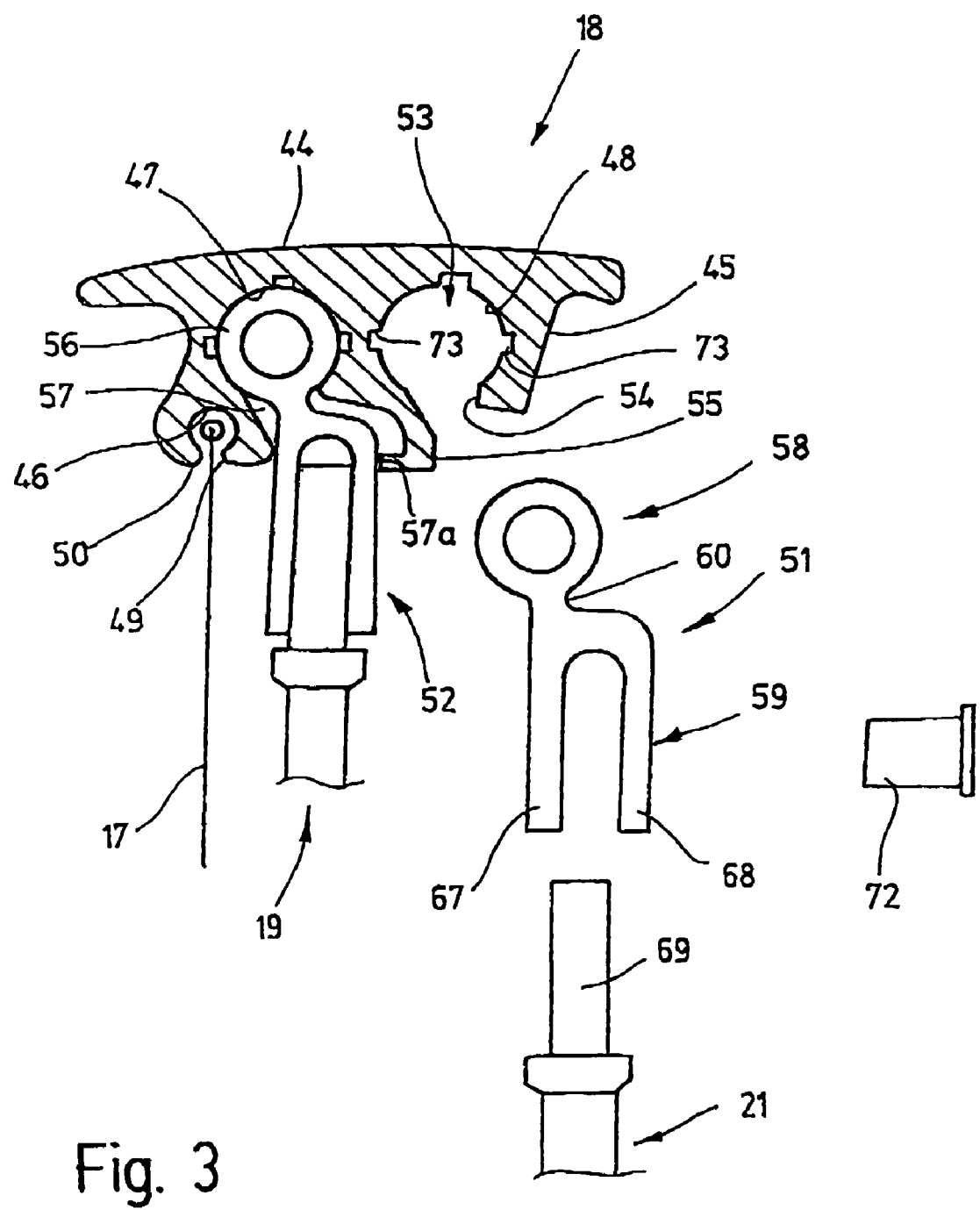
FIG. 3 is a partially exploded, lateral cross-sectional view of the pull-out element of the window shade of FIG. 1.

The construction of the coupling element 31 is shown in the enlarged representation of FIG. 3. In particular, FIG. 3 shows the end of the coupling means 31 connected to the activation lever 19. The coupling means 31 has a flexible, tube like sleeve 37 (like those typical used in Bowden cables) which is reinforced, if necessary, by a steel spiral. The flexible sleeve 37 is fixed on the housing 13 with the aid of a hose clamp 38 near the relevant end of the flexible sleeve. The other end of the sleeve 37 is anchored in a similar way to the gear 33. The anchoring of the other end of the sleeve is not shown in more detail in the drawings for reasons of clarity. This anchoring arrangement essentially looks just like what is shown in FIG. 3 for the lever side end.

A core 39, which comprises a solid wire, (made, for example, from plastic) is housed in the sleeve 37 so that the core can move freely. To connect the core 39 to the crank pin 27, a rod 40, which contains a pocket hole 41 coaxial to the rod 40, sits on the free end of the core 39. The corresponding free end of the core 39 sticks into the pocket hole 41. After inserting the core 39, the rod is bent or crimped in the region of the hole 41, so that a nondetachable, frictionally engaged connection is produced between the rod 40 and the core 39. The end of the rod 40, set apart from the core 39, carries an annular loop 42, which is set on the crank pin 27 and is secured there by a claw spring 43.

The connection of the two holding levers 19 and 21 to the pull-out element or bar 18 is shown in FIG. 3. In particular, FIG. 3 provides a cross-sectional view of the pull-out element or bar 18. The pull-out element or bar essentially comprises a plastic extrusion profile that has a constant cross section over its length. The pull-out element 18 defines a smooth roof side 44, which has a downwards extension 45 that can be viewed, in the broadest sense, as having a rectangular cross section. Overall, the extension 45 includes three grooves, 46, 47, and 48. The groove 46 is a weatherstrip groove and is undercut accordingly. It is used for receiving a weather strip 49, which is attached to the free edge of the window shade material 17 remote from the wind-up roller shaft 15. The weatherstrip groove 46 opens away from the roof side 44 with a groove slot 50.

The grooves 47 and 48 are used as guide grooves for associated sliding elements 51 and 52, which, in this case, are configured identically. The guide groove 48 includes a groove chamber 53 and a guide slot 54 that opens towards the bottom. As shown in FIG. 3, the width of the slot 54 is smaller than the diameter of the groove chamber 53, which in the illustrated embodiment has a circular cross section. The groove slot 54 points downward. Next to the groove slot 54, a contact shoulder 55, which is arranged outward of the weatherstrip groove 46, runs underneath the slot 54. The guide groove 47 has a similar construction. The guide groove 47 also includes a groove chamber 56 and a groove slot 57. Another contact shoulder is arranged underneath the slot 57 there is another contact shoulder, which is also set outward of the weatherstrip groove 46. In the illustrated embodiment, the two guide grooves 47 and 48 run parallel to each other in the shown form over the length of the pull-out element or bar 18.

Figure 4:
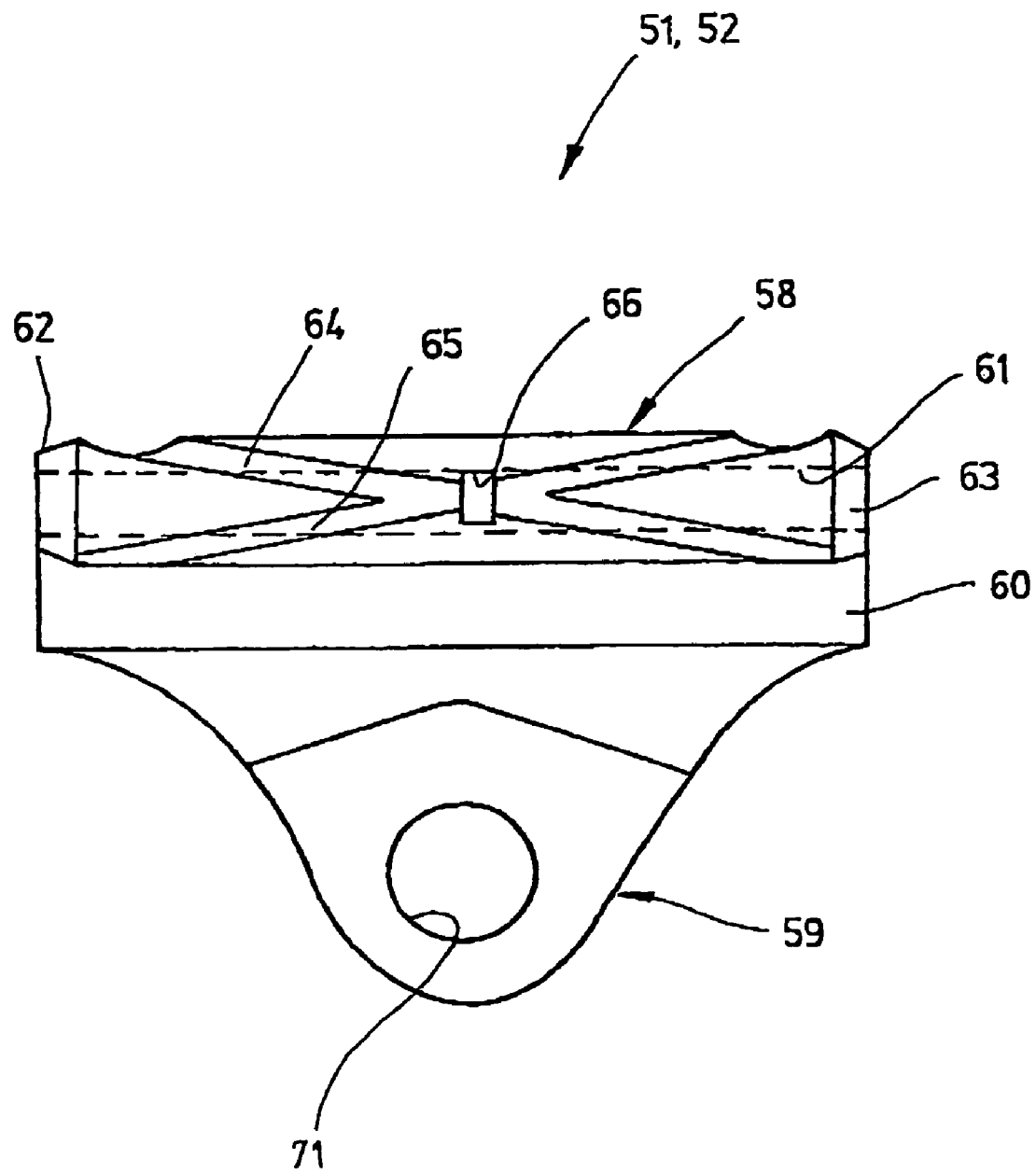
FIG. 4 is a side view of one of the sliding elements according to FIG. 3.

The two sliding elements 51, 52 are identical with reference to shape. Their form is shown in FIGS. 3 and 4. Each sliding element 51, 52 includes essentially a head 58 and a bracket 59 that is connected to the head 58 via a rail like neck part 60. The head 58 glides through the groove chamber 53 or 56, while the bracket 59 projects through the corresponding slot 54, 57 downwards from the guide groove 47, 48. The head 58 is configured as a cylindrical tube with a continuous hole or chamber 61, while the outer diameter is adapted to the diameter of the groove chamber 53 or 56. The head 58 is slightly beveled at 62 and 63 on the two end faces.

Diagonally extending grooves 64 and 65 are provided in the outer circumferential area of the head 58. The groove 64 begins in the vicinity of the bevel surface 62 and extends diagonally over the illustrated side of the head 58 to the opposite bevel surface 63, i.e., in the vicinity of rail like neck 60. The groove 65 extends in the opposite direction from the bevel surface 63 at the top side of the head to the bevel surface 62 in the vicinity of the rail like neck 60. These cut grooves 64 and 65 intersect approximately in the center relative to the longitudinal axis of the head 58. An approximately rectangular opening 66 is provided at this intersection point through which a connection between the chamber 61 and the two grooves 64 and 65 is produced. On the side of the sliding element 51, 52 not shown in the drawings, there is a similar set of diagonally running grooves. The grooves 64, 65, together with the chamber 61, form a lubricant reservoir, by means of which lubricant can be discharged to the wall of the groove chamber 53 or 56. So that the lubricant reaches all regions of the wall, the grooves 64 and 65 run diagonally, as shown, i.e., not parallel to the longitudinal axis of the head 58 or the direction of motion of the sliding element 51, 52 along the relevant guide groove 47 or 48.

In the illustrated embodiment, the bracket 59 is forked so as to produce two legs 67 and 68 that cover a correspondingly flattened end 69 of the relevant lever 21 or 19. A through-hole 71, in which a hinge pin 72 is inserted, leads through the two legs 67 and 68. This hinge pin is led through another corresponding hole in the flattened extension 69. With the aid of the hinge pin 72, the sliding element 51 is hinged at the free end of the lever 21 and the sliding element 52 is hinged at the free end of the holding lever 19. The hinge pins 72 are fixed in the axial direction in a known way in the respective sliding element 51, 52.

The operation of the window shade described thus far is as follows:

In the drawn in or retracted state or position, the two levers 19 and 21 lie approximately parallel to the wind-up roller shaft 15 underneath the run out slot 12. In this position, the roof section 44 of the pull-out element or bar 18 covers the run out slot 12 at least in the center region.

When a user wants to draw out the window shade starting from the retracted position, the user sets the geared motor 29 into gear. In this way, the two levers 19 and 21 are pivoted about axis 22 and transition from the position in which they are essentially parallel to the wind-up roller shaft 15 into a position that is approximately perpendicular to the wind-up roller shaft 15. Here, the two levers 19 and 21 pivot upwards through the slot 12 in the rear window deck 11. In this way, the levers lift the pull-out element or bar 18. Because the window shade material 17 is fixed to the pull-out element or bar 18 by means of the weather strip 79, the window shade material 17 is pulled out from the wind-up roller shaft 15 against the effect of the spring-driven motor 16. The window shade material 17 is held in front of the rear window 3. At least during the movement into the top end position, the two levers 19 and 21 also transmit forces that act perpendicular to a plane defined by the held window shade material 17.

Through pivoting the levers 19, 21 upwards, the sliding elements 51 and 52 move out of a position in which they are each on a respective side of the center of the pull-out profile 18 in the direction towards the respective end of the pull-out profile 18. The resulting tilting motion of the respective lever 19, 21 relative to the longitudinal axis of the pull-out profile 18 is received by means of the hinge arrangement between the bracket 19 and the projection 69, because the hinge axis defined by the hinge pin 72 lies perpendicular to the pivot plane in which the levers 19, 21 move.

During retraction of the window shade, the levers 19, 21 move in the opposite direction, i.e., the sliding elements 51 and 52 run from the respective end of the pull-out element or bar 18 towards the middle. Each sliding element according to the dimensioning of the disk can run past the middle, such that the levers 19, 21 cross each other at an intermediate position as can be seen in FIG. 1. In the drawn in or retracted position, the free end of one of the levers, e.g., the lever 19, is located at a point that lies somewhere between the free end of the lever 21 and its pivot bearing.

By using a lubricant reservoir including the two sided grooves 64, 65, as well as the chamber 61 that connects to the grooves 64, 65 via the opening 66, a considerable amount of lubricant can be kept ready. This lubricant can be worked again and again to the surface of the groove chamber 53 or 56 through the capillary effect and bleeding of oil. Thus, the coefficient of friction between the relevant guide groove 47, 48 and the head 58 of the relevant sliding element 51, 52 is kept small. Thus, non-smooth sliding through the relevant guide groove 47, 48 is prevented.

When the pull-out element or bar 18 no longer contacts the edges of the drawing slot 12, the biasing in the window shade material 17 must generate a tilting moment. The weatherstrip groove 46 is located laterally offset relative to the guide groove 47 and also laterally offset relative to the guide groove 48, so that the biasing of the window shade material 17 must tilt the pull-out element or bar 18 about an axis that lies parallel to the axis of the pull-out element or bar 18. To receive this tilting moment and to prevent tipping of the pull-out profile 18, the shoulder 55 and the corresponding shoulder for the slot 57 are provided, whereby the pull-out profile 18 is supported on the bracket 59 of the corresponding sliding element 51 or 52. The neck 60 runs contact free through the corresponding slot 54, 57.

At least in the end position, the tilting moment cannot be received, i.e., not through the interaction of the two sliding elements 51, 52. In that sense, FIG. 3 can be somewhat misleading. At the end of the stroke, the two sliding elements 51 and 52 are spaced from each other, namely by the length of the pull-out element or bar 18. Due to the tendency of the pull-out element or bar 18 to be subject to torsion, the pull-out element or bar 18 would otherwise be twisted at least relative to the guide groove 48. To prevent tipping, another guide shoulder 57a relative to the shoulder 57 can be provided, as can be seen in the vicinity of the shoulder 55. It is also possible to move in the respective slot edge for this purpose, e.g., each surface of the slot, from which the line for the reference symbol 54 extends.

In the illustrated embodiment, the contact points, which receive the tilting moment, are separated relatively far apart so that the holding forces created by the tilting moment are small. This likewise contributes to smooth separation.

Alternatively, the lubricant reservoir can include lubricant grooves 73 running in the longitudinal direction, e.g., in the wall of the groove chamber 53 or 58.

The use of lubricant grooves is not limited to the illustrated sliding elements 51, 52, which have a head 58 with a cylindrical cross section. Heads with profiled, e.g., square, cross sections are also possible, if the lubricant grooves 64, 65 have a corresponding configuration. Moreover, there is no need for an illustrative representation in order to grasp that in this case the groove chamber 53 or 56 has a correspondingly profiled cross section, e.g., rectangular or square.

When the head 58 of the sliding element 51 or 52 runs through the associated guide groove 47, 48, a tilting moment is produced on the associated sliding element 51, 52 relative to an axis that extends approximately through the opening 66. Therefore, increased contact forces on the wall of the respective groove chamber 56 are produced on the ends of the head 58 in the vicinity of the bevel surfaces 62 and 63. If these forces exceed a certain amount, this can lead to self-blocking according to known inter-relationships. This state is dependent on the spacing of the contact points relative to the longitudinal extent of the head 58 and the coefficient of friction in a known way. Such effects can be prevented by the lubricant when over the course of time the contact points of the head 58 on the wall of the groove chamber 53, 56 move closer to each other due to wear.

Figure 5:
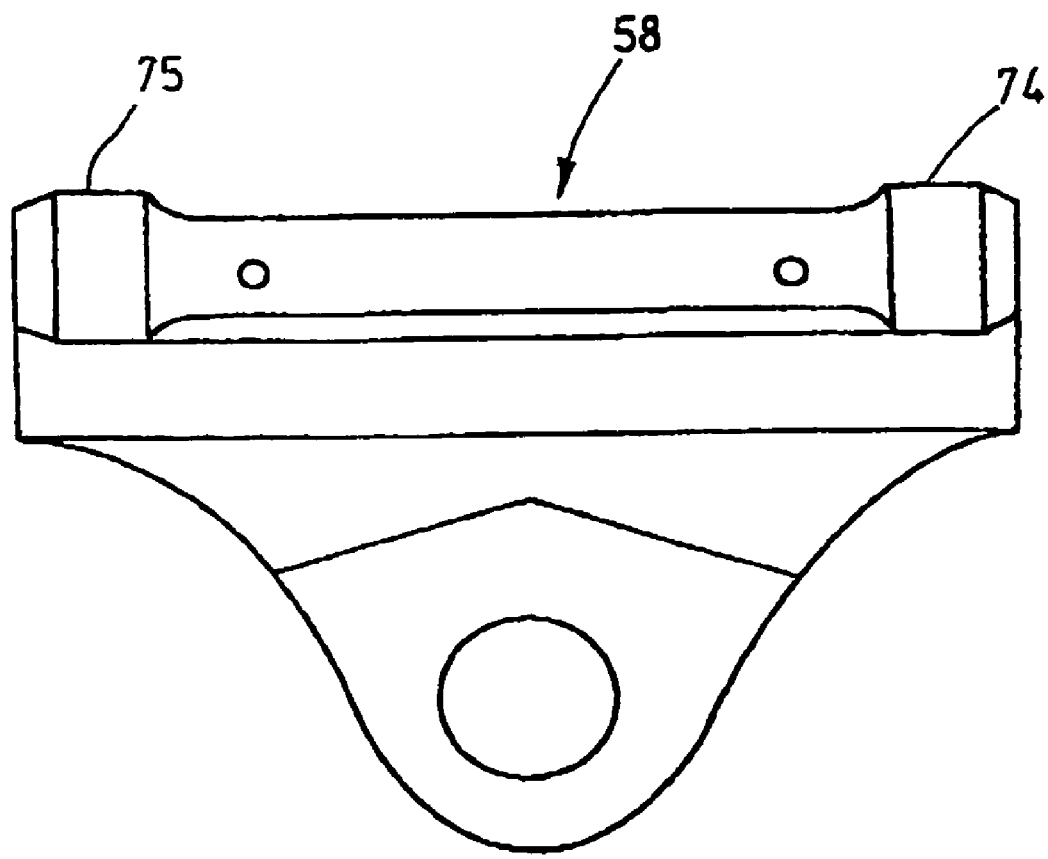
FIG. 5 is a side view of an alternative embodiment of a sliding element.

The embodiment of FIG. 5 provides another way to prevent this damaging effect. In the FIG. 5 embodiment, the head 58 is constricted over a considerable length of the region between the ends, e.g., approximately 70% of the length of the head 58. Only at the outer ends at 74 and 75 does the head 58 have the diameter corresponding to that of the groove chamber 53, 56. The head 58 thus attains the appearance of a dumbbell or a bone when viewed from the side. Thus, even when experiencing continuing wear, the contact points remain far from each other. In addition, the constricted region between the ends 74 and 75 can also be used as a lubricant reservoir.

The thicker ends of the head 58 also permit a stop-free, smooth run in a pull-out element or bar 18, which, as shown, is not exactly straight, but slightly curved in order to better follow the curved profile of the rear window 3 when fully extended.

The invention is illustrated in connection with a rear window shade. However, the invention is not limited to the use of guiderail less rear window shades, as will be clear to those of ordinary skill in the art. In a similar way, the invention can also be similarly applied to window shades that operate according to the same principle and, e.g., are attached to the side windows, or window shades that also function as a separating screen in order to divide the passenger compartment from a storage compartment.

A window shade arrangement has holding levers in order to draw the window shade material from the wind-up roller shaft and to hold it in a drawn out or extended position. The holding levers include hinged sliding elements that slide in associated guide grooves in the pull-out element or bar. To ensure stop-free, smooth operation, these sliding elements can be provided with a lubricant reservoir, can have a dumbbell shape, can have a cylindrical shape or some combination thereof.

What is claimed is:

1. A window shade for a window of a motor vehicle comprising:
   a rotatably supported wind-up roller shaft;
   a window shade material having first and second parallel edges, the first edge of the window shade material being attached to the wind-up roller shaft;
   a first drive device for rotating the wind-up roller shaft in a wind-up direction;
   a pull rod attached to the second edge of the window shade material, the pull rod including at least one guide groove extending in a longitudinal direction of the pull rod, wherein the guide groove has a cross-sectional shape including a groove chamber and a groove slot, the groove slot having an open width smaller than an open width of the groove chamber;
   two holding levers each of which is supported via a respective bearing such that the respective lever can pivot about a respective pivot axis that extends perpendicular to a longitudinal axis of the wind-up roller shaft;

a second drive device coupled to the holding levers for moving the holding levers from a first position in which the pull rod is adjacent to the wind-up roller shaft to a second position in which the pull rod is farther removed from the wind-up roller shaft;

wherein each holding lever is hingably connected to a respective sliding element, the sliding element including a head and a bracket that extends from the head, said bracket of each sliding element being connected as a hinge to a respective one of the holding levers, the head sitting in and at least partially surrounded by the groove chamber of the at least one guide groove in the pull rod and the bracket sitting in the groove slot so that the respective sliding element can move in the at least one guide groove, each sliding element including a lubricant reservoir that is formed in the head of the sliding element that sits in the groove chamber; and said head of each sliding element having a length relative to a direction parallel to the longitudinal extent of the guide groove that is at least two times greater than a largest cross sectional dimension of the groove chamber.

2. The window shade according to claim 1, wherein the pull rod contains two parallel guide grooves.

3. The window shade according to claim 1, wherein the groove chamber has a non-circular cross sectional shape in order to transmit a tilting moment exerted by the window shade material on the pull rod about an axis parallel to the longitudinal axis of the wind-up roller shaft to the holding levers.

4. The window shade according to claim 3, wherein a contact shoulder extends at a distance from the groove slot in order to transmit the tilting moment exerted by the window shade material on the pull rod about an axis parallel to the longitudinal axis of the wind-up roller shaft to the holding levers.

5. The window shade according to claim 1, wherein the groove chamber has an additional groove-like lubricant reservoir that runs in a longitudinal direction of the groove chamber.

6. The window shade according to claim 1, wherein an axis of the hinge runs essentially parallel to the pivot axis of the respective holding lever.

7. The window shade according to claim 1, wherein the head of each sliding element having a generally dumbbell like cross-sectional shape when viewed from a side perpendicular to a longitudinal axis of the guide groove with the head having a tapered middle region between two end sections.

8. The window shade according to claim 7, wherein the tapered region forms the lubricant reservoir.

9. The window shade according to claim 1, wherein the bracket comprises a plate shaped bracket.

10. The window shade according to claim 1, wherein the bracket is forked.

11. The window shade according to claim 1, wherein the first drive device comprises a spring-driven motor.

12. The window shade according to claim 1, wherein the first drive device comprises an electric motor.

13. The window shade according to claim 1, wherein the second drive device includes at least one spring for biasing holding levers towards a retracted position of the window shade material.

14. The window shade according to claim 1, wherein the second drive device comprises a geared motor.

15. The window shade according to claim 1, wherein each holding lever comprises first and second arms, the first arm being coupled to the pull bar and the second arm being coupled to the second drive device.

16. A window shade for a window of a motor vehicle comprising:

a rotatably supported wind-up roller shaft;

a window shade material having first and second parallel edges, the first edge of the window shade material being attached to the wind-up roller shaft;

a first drive device for rotating the wind-up roller shaft in a wind-up direction;

a pull rod attached to the second edge of the window shade material, the pull rod including at least one guide groove extending in a longitudinal direction of the pull rod, wherein a cross-sectional shape of the guide groove includes a groove chamber and a groove slot, the groove slot having an open width smaller than an open width of the groove chamber;

two holding levers each of which is supported via a respective bearing such that the respective lever can pivot about a respective pivot axis that extends perpendicular to a longitudinal axis of the wind-up roller shaft; and a second drive device coupled to the holding levers for moving the holding levers form a first position in which the pull rod is adjacent to the wind-up roller shaft to a second position in which the pull rod is farther removed from the wind-up roller shaft;

wherein each holding lever is hingably connected to a respective sliding element that sits in the at least one guide groove in the pull rod so that the respective sliding element can move in the at least one guide groove, each sliding element having a head with a substantially circular cross-sectional shape that sits in the guide groove.

17. The window shade according to claim 16, wherein the pull rod contains two parallel guide grooves.

18. The window shade according to claim 16, wherein the groove chamber has a non-circular cross sectional shape in order to transmit a tilting moment exerted by the window shade material on the pull rod about an axis parallel to the longitudinal axis of the wind-up roller shaft to the holding levers.

19. The window shade according to claim 18, wherein a contact shoulder extends at a distance from the groove slot in order to transmit the tilting moment exerted by the window shade material on the pull rod about an axis parallel to the longitudinal axis of the wind-up roller shaft to the holding levers.

20. The window shade according to claim 16, wherein the head of each sliding element includes on an outer surface thereof at least one groove that extends in a non-parallel manner relative to a direction of motion of the sliding element in the guide groove, the at least one groove forming at least part of a lubricant reservoir.

21. The window shade according to claim 16, wherein the head of the sliding element includes a chamber that is continuous in the longitudinal direction and is connected to the outer peripheral surface of the head of the respective sliding element via radial openings, the chamber forming at least part of a lubricant reservoir.

22. The window shade according to claim 16, wherein the first drive device comprises a spring-driven motor.

23. The window shade according to claim 16, wherein the second drive device includes at least one spring for biasing holding levers towards a retracted position of the window shade material.

24. The window shade according to claim 16, wherein each holding lever comprises first and second arms, the first arm being coupled to the pull bar and the second arm being coupled to the second drive device.

25. The window shade according to claim 16, wherein each sliding element has a bracket that extends from the head and which is connected as a hinge to the associated holding lever.

26. The window shade according to claim 16, wherein the second drive device comprises a geared motor.

27. The window shade according to claim 26, wherein the hinge axis runs essentially parallel to the pivot axis of the respective holding lever.

28. A window shade for a window of a motor vehicle comprising:
   a rotatably supported wind-up roller shaft;
   a window shade material having first and second parallel edges, the first edge of the window shade material being attached to the wind-up roller shaft;
   a first drive device for rotating the wind-up roller shaft in a wind-up direction;
   a pull rod attached to the second edge of the window shade material, the pull rod including at least one guide groove extending in a longitudinal direction of the pull rod, wherein a cross-sectional shape of the guide groove includes a groove chamber and a groove slot, the groove slot having an open width smaller than an open width of the groove chamber;
   two holding levers each of which is supported via a respective bearing such that the respective lever can pivot about a respective pivot axis that extends perpendicular to a longitudinal axis of the wind-up roller shaft; and
   a second drive device coupled to the holding levers for moving the holding levers form a first position in which the pull rod is adjacent to the wind-up roller shaft to a second position in which the pull rod is farther removed from the wind-up roller shaft;
   wherein each holding lever is hingably connected to a respective sliding element having a head that sits in the at least one guide groove in the pull rod so that the respective sliding element can move in the at least one guide groove, the head of each sliding element having an approximately dumbbell-shaped cross-sectional configuration when viewed from a side perpendicular to a longitudinal axis of the guide groove with the head having a tapered middle region between two end sections.

29. The window shade according to claim 28, wherein the pull rod contains two parallel guide grooves.

30. The window shade according to claim 28, wherein the groove chamber has a non-circular cross sectional shape in order to transmit a tilting moment exerted by the window shade material on the pull rod about an axis parallel to the longitudinal axis of the wind-up roller shaft to the holding levers.

31. The window shade according to claim 28, wherein a contact shoulder extends at a distance from the groove slot in order to transmit the tilting moment exerted by the window shade material on the pull rod about an axis parallel to the longitudinal axis of the wind-up roller shaft to the holding levers.

32. The window shade according to claim 28, wherein each sliding element has a bracket that extends from the head and which is connected as a hinge to a respective one of the holding levers.

33. The window shade according to claim 32, wherein an axis of the hinge runs essentially parallel to the pivot axis of the respective holding lever.

34. The window shade according to claim 28, wherein the tapered region forms part of a lubricant reservoir.

35. The window shade according to claim 28, wherein the first drive device comprises a spring-driven motor.

36. The window shade according to claim 28, wherein the second drive device includes at least one spring for biasing holding levers towards a retracted position of the window shade material.

37. The window shade according to claim 28, wherein the second drive device comprises a geared motor.

38. The window shade according to claim 28, wherein each holding lever comprises first and second arms, the first arm being coupled to the pull bar and the second arm being coupled to the second drive device.

39. A window shade for a window of a motor vehicle comprising:
   a rotatably supported wind-up roller shaft;
   a window shade material having first and second parallel edges, the first edge of the window shade material being attached to the wind-up roller shaft;
   a first drive device for rotating the wind-up roller shaft in a wind-up direction;
   a pull rod attached to the second edge of the window shade material, the pull rod including at least one guide groove extending in a longitudinal direction of the pull rod, wherein a cross-sectional shape of the guide groove includes a groove chamber and a groove slot, the groove slot having an open width smaller than an open width of the groove chamber;
   two holding levers each of which is supported via a respective bearing such that the respective lever can pivot about a respective pivot axis that extends perpendicular to a longitudinal axis of the wind-up roller shaft; and
   a second drive device coupled to the holding levers for moving the holding levers form a first position in which the pull rod is adjacent to the wind-up roller shaft to a second position in which the pull rod is farther removed from the wind-up roller shaft;
   wherein each holding lever is hingably connected to a respective sliding element that sits in the at least one guide groove in the pull rod so that the respective sliding element can move in the at least one guide groove, each sliding element having a head with a substantially circular cross-sectional shape that sits in the guide groove; and
   wherein a contact shoulder extends at a distance from the groove slot in order to transmit the tilting moment exerted by the window shade material on the pull rod about an axis parallel to the longitudinal axis of the wind-up roller shaft to the holding levers.

40. A window shade for a window of a motor vehicle comprising:
   a rotatably supported wind-up roller shaft;
   a window shade material having first and second parallel edges, the first edge of the window shade material being attached to the wind-up roller shaft;
   a first drive device for rotating the wind-up roller shaft in a wind-up direction;
   a pull rod attached to the second edge of the window shade material, the pull rod including at least one guide groove extending in a longitudinal direction of the pull rod, wherein the guide groove has a cross-sectional shape including a groove chamber and a groove slot, the groove slot having an open width smaller than an open width of the groove chamber;
   two holding levers each of which is supported via a respective bearing such that the respective lever can pivot about a respective pivot axis that extends perpendicular to a longitudinal axis of the wind-up roller shaft;
   a second drive device coupled to the holding levers for moving the holding levers from a first position in which the pull rod is adjacent to the wind-up roller shaft to a second position in which the pull rod is farther removed from the wind-up roller shaft;

wherein each holding lever is hingably connected to a respective sliding element, the sliding element including a head and a bracket that extends from the head, said bracket of each sliding element being connected as a hinge to a respective one of the holding levers, the head sitting in and at least partially surrounded by the groove chamber of the at least one guide groove in the pull rod and the bracket sitting in the groove slot so that the respective sliding element can move in the at least one guide groove, each sliding element including a lubricant reservoir that is formed in the head of the sliding element that sits in the groove chamber; and said head of each sliding element including on an outer surface thereof at least one groove that extends in a non-parallel manner relative to a direction of motion of the sliding element in the guide groove, the at least one groove forming at least part of the lubricant reservoir.

41. A window shade for a window of a motor vehicle comprising:

a rotatably supported wind-up roller shaft;

a window shade material having first and second parallel edges, the first edge of the window shade material being attached to the wind-up roller shaft;

a first drive device for rotating the wind-up roller shaft in a wind-up direction;

a pull rod attached to the second edge of the window shade material, the pull rod including at least one guide groove extending in a longitudinal direction of the pull rod, wherein the guide groove has a cross-sectional shape including a groove chamber and a groove slot, the groove slot having an open width smaller than an open width of the groove chamber;

two holding levers each of which is supported via a respective bearing such that the respective lever can pivot about a respective pivot axis that extends perpendicular to a longitudinal axis of the wind-up roller shaft;

a second drive device coupled to the holding levers for moving the holding levers from a first position in which the pull rod is adjacent to the wind-up roller shaft to a second position in which the pull rod is farther removed from the wind-up roller shaft;

wherein each holding lever is hingably connected to a respective sliding element, the sliding element including a head and a bracket that extends from the head, said bracket of each sliding element being connected as a hinge to a respective one of the holding levers, the head sitting in and at least partially surrounded by the groove chamber of the at least one guide groove in the pull rod and the bracket sitting in the groove slot so that the respective sliding element can move in the at least one guide groove, each sliding element including a lubricant reservoir that is formed in the head of the sliding element that sits in the groove chamber; and said head of the sliding element including a chamber that is continuous in the longitudinal direction and is connected to the outer peripheral surface of the head of the respective sliding element via radial openings, the chamber forming at least part of the lubricant reservoir.

* * * * *